Figure 1:
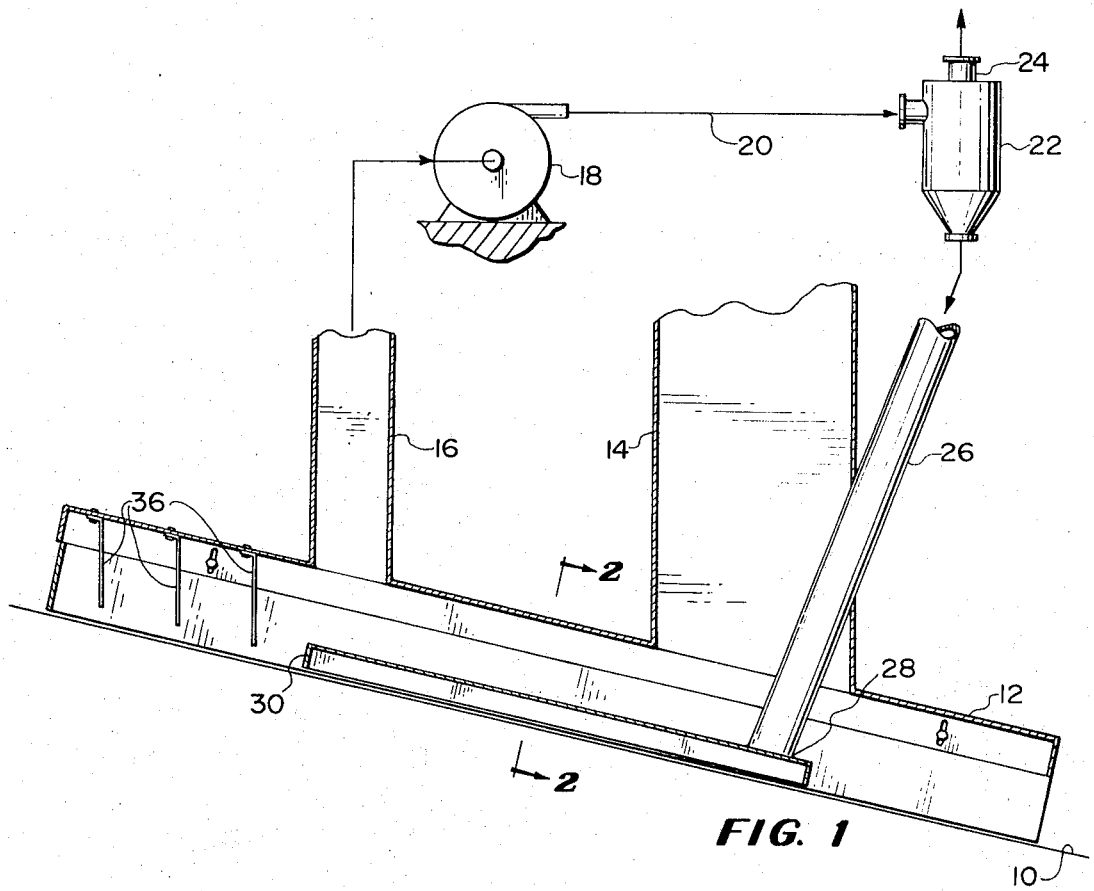

United States Patent [19]
Johanningmeier

[11] 3,780,495
[45] Dec. 25, 1973

[54] METHOD AND APPARATUS FOR CONTROLLING DUST

[75] Inventor: Charles E. Johanningmeier, Carlsbad, N. Mex.

[73] Assignee: International Minerals & Chemical Corporation, Libertyville, Ill.

[22] Filed: May 1, 1972

[21] Appl. No.: 249,356

[52] U.S. Cl............................. 55/1, 55/430, 55/466
[51] Int. Cl............................................. B01d 45/12
[58] Field of Search....................... 98/115; 141/93; 198/228; 55/1, 290, 338, 340, 430, 467, 237, 466

[56] References Cited
UNITED STATES PATENTS
3,750,622   8/1973   Repp et al. ................. 55/237 X
3,710,558   1/1973   Feder........................... 55/338
3,161,464   12/1964  Andersson et al. ........... 55/466 X

*Primary Examiner*—Frank W. Lutter
*Assistant Examiner*—Kathleen J. Prunner
*Attorney*—James E. Wolber et al.

[57] ABSTRACT

A method and apparatus is disclosed for controlling dust in the handling of dusty particulate material by belt conveyor. Dust-laden air generated by the deposit of dusty material on a belt conveyor is gathered by a fan and hood system enveloping the locus where the material is dropped on the conveyor. The dust-laden air is separated into a dust fraction and an air fraction and the dust fraction is returned to the conveyor through a downwardly extending pipe which communicates with a tunnel-shaped shoe just above the conveyor belt. The shoe is located such that it is completely enclosed by the particulate material deposited on the conveyor.

6 Claims, 2 Drawing Figures

PATENTED DEC 25 1973  3,780,495

METHOD AND APPARATUS FOR CONTROLLING DUST

BACKGROUND OF THE INVENTION

Moving surface type conveyors, such as belt conveyors, are very useful in handling particulate solid materials. Where the particulate solids contain significant quantities of fines, i.e., materials generally smaller than about 200 mesh, a serious dust problem arises where the particulate material is deposited on the moving surface, which is usually a belt. This is accomplished conventionally by feeding the material through a downwardly extending tube from a hopper and dropping it onto the conveyor belt.

The locus of deposit of the material may, in accordance with the prior art, be hooded to collect the dust-laden air. The dust-laden air may then be treated by conventional means to separate the dusty fine particles. The dusty particles may become a waste material, or some effort may be made to feed them back into the material handling system for reclamation. Reintroducing the solids into the materials handling system generally results, however, merely in the production of more serious dust problems as fines tend to accumulate in the system by recycling.

DESCRIPTION OF THE INVENTION

In accordance with this invention a method is provided for controlling dust in depositing dusty particulate material onto a conveyor surface. The conveyor surface conventionally is the moving surface of a belt. Dust-laden air generated by the deposit of dusty material on the moving surface is collected by means of a hood, and separated into a dust fraction and an air fraction by conventional dust separating equipment. The dust of fines from the separator is returned to the conveyor and deposited in a relatively narrow band on the moving belt. The particulate material is then deposited on the moving belt in a wider band so as to completely cover the narrower band of dusty fines. By this means the fine or dusty material is substantially enclosed by the bulk of particulate material carried on the belt, and reintroduction into the air and recycle through the system is very substantially reduced. In a preferred embodiment of the invention, the dust is applied to the center of the moving belt in a narrow band through a conduit which terminates just above the belt at a point which is substantially completely enclosed by the bulk of particulate material carried by the belt.

Another advantage of the practice of the method of this invention is realized in the handling of hot particulate material. Heat transfer from the material to the flexible moving belt results in rapid deterioration of the belt and necessitates frequent replacement. In the practice of the instant invention the dust fraction is cooled to approximately ambient temperatures by contact with the relatively large volume of air handled in collecting the dust. Thus, the dust fraction obtained from the dust separator is relatively cool, and when applied to the surface of the moving belt provides an insulating layer which reduces heat transfer from the bulk of hot particulate material to the belt. To maximize the beneficial effect on belt life, it may be desirable to deposit the dust on the belt in a wider band than that preferred for handling cold particulate material.

Figure 2:
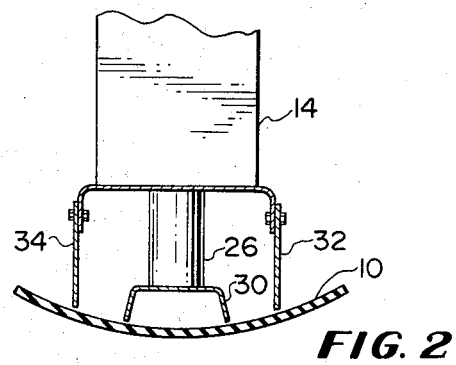

The invention will be explained in connection with the drawing, of which,

FIG. 1 is a side elevational schematic view of a belt conveyor equipped with the apparatus of this invention, and, FIG. 2 is a cross-sectional view taken along line 2—2 in FIG. 1.

Referring to FIG. 1, the top surface of the moving belt of a belt conveyor is designated by the numeral 10. This moving surface is shown as flat in FIG. 1 and as the more conventional concave belt surface in FIG. 2. A metal hood 12 extends axially along the conveyor adjacent the upper surface thereof, and cooperates with the moving surface of the conveyor or conveyor belt to form an enclosure for entrapping and collecting dust. A downwardly extending product discharge conduit 14 extends from a product hopper, not shown, and communicates with the interior of hood 12, terminating above the surface 10 of the belt. Hood 12 is provided with an exhaust duct 16 through which dust-laden air is drawn off from the hood by blower 18 and then carried through duct 20 to cyclonic dust separator 22. Purified air is vented from the separator 22 at 24 and the dust fraction is collected at the bottom of separator 22 and discharged through tube 26 for recycle to the conveyor. Tube 26 terminates within the space enclosed by hood 12 just above the upper surface 10 of the conveyor. Secured to the lower terminus 28 of tube 26, and communicating therewith, is a channel-shaped shoe member 30 which is best shown in FIG. 2. Shoe member 30 is positioned to cooperate with the upper surface 10 of the belt to form a tunnel-shaped passage which extends axially along the belt surface, preferably for a distance at least equal to the width of the belt. The tunnel-shaped passage defined by the upper surface of the belt and shoe member 30 is narrow, and where the bulk of particulate material is not hot is preferably no wider than ¼ of the width of the belt. The purpose is to confine the recycled dust to a relatively narrow band which will be completely covered and enclosed by product discharged onto the belt through tube 14.

Hood 12 is preferably provided with adjustable side members 32 and 34 which extend the length of the hood and are adapted to provide minimal air space between the hood and the upper surface 10 of the belt. Hood 12 is also preferably provided with a plurality of damper cloths 36 which further assist in containing dust within the hood.

In operation, dust generated by the discharge of particulate material through tube 14 onto the surface 10 of a conveyor belt is enclosed within hood 12 and evacuated through duct 16 by means of blower 18 and then transported through duct 20 to cyclonic dust collector 22. Purified air is discharged from dust separator 22 and a dust fraction is returned by gravity feed through tube 26 and deposited on the belt within the tunnel-shaped passage formed between shoe member 30 and the upper surface 10 of the belt. Product discharged through conduit 14 onto the belt completely covers shoe member 30 and forms a seal to prevent the recycled dust from again escaping into the air.

In this manner the original dusty particulate product discharged onto the conveyor belt is substantially reconstituted to its original particle distribution, while buildup of dust or fine material in the system is substantially eliminated.

What is claimed is:

1. The method of controlling dust in the depositing of dusty particulate material on a conveyor including a moving surface comprising collecting dust-laden air generated by the depositing of said material on said surface, separating the dust from the air, collecting and redepositing the dust in a relatively narrow band on said moving surface, and depositing said material on said moving surface over said dust in a band wider than the dust band to substantially completely cover the dust band.

2. A method in accordance with claim 1 including the step of conveying the dust to a location just above said surface and below the location of deposit of said material, whereby said dust when deposited on said surface is substantially completely contained by said surface and said material.

3. Dust control apparatus for use with a moving surface conveyor comprising hood means cooperating with said moving surface to form an enclosure for confining and collecting dust-laden air, separator means connected to said hood means for separating dust-laden air into a dust fraction and an air fraction, means for conveying the dust fraction and depositing it on said surface at a point within the space enclosed by said hood means, and means for discharging particulate material onto said surface within said hood means and on top of and substantially completely covering said dust fraction.

4. The apparatus in accordance with claim 3 in which said means for discharging particulate material comprises a gravity feed conduit communicating with the interior of said hood means and having a terminus above said moving surface.

5. The apparatus in accordance with claim 4 in which said means for conveying and depositing dust comprises a tube extending downwardly through said hood means and terminating below said terminus of said gravity feed conduit but above said moving surface.

6. An apparatus in accordance with claim 5 including a channel shaped shoe member having downwardly depending flanges positioned above and adjacent to said moving surface and extending to form a tunnel-like passage in the direction of movement of said surface, said downwardly extending tube communicating with the interior of said tunnel-like passage.

* * * * *